United States Patent
Kasperchik et al.

(10) Patent No.: US 6,742,456 B1
(45) Date of Patent: Jun. 1, 2004

(54) RAPID PROTOTYPING MATERIAL SYSTEMS

(75) Inventors: Vladek Kasperchik, Corvallis, OR (US); Terry M. Lambright, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/295,132

(22) Filed: Nov. 14, 2002

(51) Int. Cl.$^7$ ................ B41F 1/32; B28B 1/14
(52) U.S. Cl. ............ 101/483; 101/401.1; 264/308; 264/DIG. 72; 106/162.9; 156/305
(58) Field of Search ............. 101/483, 401.1; 264/16, 69, 111, 123, 162.9, 287.84, 308, 600, 634, 636, 808, 816, 204.1; 430/287.1, 276.1, 286.1, 302, 303; 156/284, 305, 59; 426/546

(56) References Cited

U.S. PATENT DOCUMENTS

| | | |
|---|---|---|
| 3,751,391 A | 8/1973 | Smith et al. |
| 3,814,717 A | 6/1974 | Wilson et al. |
| 5,204,055 A | 4/1993 | Sachs et al. |
| 5,340,656 A * | 8/1994 | Sachs et al. ............ 428/546 |
| 5,387,830 A * | 2/1995 | Kukimoto ............... 264/69 |
| 5,851,465 A | 12/1998 | Bredt |
| 5,902,441 A | 5/1999 | Bredt et al. |
| 6,080,345 A * | 6/2000 | Chalasani et al. ........ 264/109 |
| 6,284,072 B1 * | 9/2001 | Ryan et al. ............. 156/59 |
| 6,503,691 B1 * | 1/2003 | Goodlin et al. .......... 430/278.1 |
| 2001/0050031 A1 * | 12/2001 | Bredt et al. ............. 106/162.9 |
| 2002/0125392 A1 * | 9/2002 | Schulman et al. ........ 264/308 |

FOREIGN PATENT DOCUMENTS

WO    WO 01/34371 A2    5/2001

* cited by examiner

*Primary Examiner*—Eugene H. Eickholt

(57) ABSTRACT

A rapid prototyping system preferably includes a basic component in powder form selected from the group consisting of a metal oxide, and one or more aluminosilicate glasses; an acidic component (polymeric, oligomeric or polymerizable low molecular weight acid or hydrolyzable acidic metal salt); and an aqueous binder capable of stimulating a crosslinking reaction between the basic component and the acidic component to form a three-dimensional printed object.

53 Claims, No Drawings

RAPID PROTOTYPING MATERIAL SYSTEMS

FIELD OF THE INVENTION

The present invention relates to the field of rapid prototyping. More specifically, the present invention relates to a material system for use in rapid prototyping.

BACKGROUND OF THE INVENTION

Rapid prototyping is fast becoming a popular process for manufacturing three-dimensional objects including prototype parts and working tools such as structural ceramics and ceramic shell molds. One form of rapid prototyping involves a process of sequentially forming layers.

In this process, a powdery material is used to form each individual layer of the desired product.

Such a printing process offers the advantages of speedy fabrication and low materials cost. It is considered one of the fastest rapid prototyping methods, and can be performed using a variety of colors as well.

However, there are several disadvantages in conventional powder based rapid prototyping processes including the fragility of the resulting product. Poor mechanical properties in the final product are characterized by a low modulus of elasticity and low fracture strength. Weakness in compression and tensile failures at low stress may be due to low density, poor adhesion between powder particles, low density of particles, and the presence of voids. In both the intralayer and interlayer levels, the powder particles are only loosely glued together. More particularly, powders that are presently being used in the market are based on gypsum and/or water swellable polymers such as starches, PVA, etc. Interaction of these powders with an aqueous binder results in poor mechanical strength as well as high porosity of the green object. Also, parts made by powder based rapid prototyping as well as jetted, direct build-up type rapid prototyping suffer from poor strength. The latter is due to the fact that only lower molecular weight polymers (namely their solutions) can be jetted since high molecular weight polymers have viscosities that are too high.

Further, the poor mechanical properties in the resulting product lead to the fact that the base or "green" object, which is fabricated by printing layers in a powder bed, must be subjected to labor intensive post-processing. This post-processing often involves reinforcing the printed object by soaking it in binding or strengthening agents such as cyanoacrylate glue, etc. which penetrate the surface and fill the interconnected pores within the bulk. Gypsum based powders and water swellable polymers currently available have long swelling times, which can be thirty minutes or more. Another disadvantage of this and similar processes is that the resulting products can have a poor resolution, represented by a grainy texture of the product.

While post-processing drying of the resulting article improves the mechanical properties slightly, the improvements are minimal and the drying process is very slow. Other post-processing measures include reinforcing with polymerizable glues such as cyanoacrylate, or surface finishing, but these measures are costly and labor intensive as well. Ultimately the mechanical properties and surface finish depend on the properties of the system of materials in concert with their ability to intermix uniformly and react sufficiently.

SUMMARY OF THE INVENTION

In one of many possible embodiments, the present invention provides a rapid prototyping system including a basic component in powder form selected from the group consisting of a metal oxide, and one or more aluminosilicate glasses; an acidic component; and an aqueous binder capable of stimulating a crosslinking reaction between the basic component and the acidic component to form a three-dimensional printed object.

Additional advantages and novel features of the invention will be set forth in the description which follows or may be learned by those skilled in the art through reading these materials or practicing the invention. The advantages of the invention may be achieved through the means recited in the attached claims.

DETAILED DESCRIPTION OF THE PREFERRED EMBODIMENTS

In a wide variety of embodiments, the present invention provides a system for rapid prototyping, the compositions included in the system, and a rapid prototyping method incorporating the system. The system for rapid prototyping is preferably leveraged from so-called acid-base cements. The components included in the system preferably include a base such as a metal oxide or an aluminosilicate glass, a polymeric acid or other acid, and an aqueous binder. The basic powder interacts with the acid in the presence of water, causing the formation of an ionically crosslinked hydrogel salt. Formation of the crosslinked hydrogel causes setting of the mixture.

There are three general possibilities for implementation of the system and the materials included in rapid prototyping systems according to the present invention. First, both reactive components, i.e., the acid component and the basic component, can be present in a dry powder mixture. The powder is then inkjet printed with an aqueous or polar solvent binder solution that does not contain any of the reactive components that form the cement. Second, a dry powder mixture can contain only the basic component. An aqueous or polar solvent binder solution that includes the acid component is then jetted onto the powder bed during the printing process. Third, a dry powder can contain the basic component as well as some of the acid component as a mixture. An aqueous or polar solvent binder solution is then used that includes some of the acid component dissolved therein, so that both the powder mixture and the aqueous binder include some of the reactive acid component. The aqueous or polar solvent binder solution and acid component mixture is then jetted onto the powder bed containing the mixture of the acid and basic components.

Apart from the chemical aspects of the present invention, the printing process is similar to the conventional mechanics associated with rapid prototyping that uses a printing process. Multiple planar layers are printed and adjoined together to form a three-dimensional object. Printing is performed layer-by-layer, with each layer representing a cross section of a portion of the final desired product. The powder material forms each individual layer, and is evenly distributed and compressed by compression means such as a roller. When the printer used in the rapid prototyping method is an ink jet printer, a printer head deposits the binder onto the powder in a two-dimensional pattern, and the powder is bonded in the areas,where the adhesive is deposited, thereby forming a printed layer of the final object to be produced. Predetermined portions of the adjacent printed layers are adhered one to another by the use of an aqueous binder, resulting in the joining of the individual cross sections of the final product. The binder is applied simultaneously with the printing of each individual layer.

The "un-printed" regions where no adhesive has been applied are then separated from the printed regions where adhesive binder has been applied, leaving a three-dimensional printed base or "green" product.

Next, the chemical aspects of the present invention will be described. The acid component of the rapid prototyping system is water/solvent soluble, and is acidic relative to water/solvent. Consequently, contact of the acidic component with the aqueous or polar solvent binder solution causes protons to dissociate from the acidic component. The free protons are immediately attracted to the basic component of the rapid prototyping system, and the basic component releases multivalent cations ($Me^{+Z}$) as they are replaced by the protons.

The released cations from the basic component of the rapid prototyping system mediate the crosslinking of the compounds that make up the acid component. Ionic crosslinking of the acidic compounds reduces the mobility of the acid component. Eventually the crosslinking process results in solidification of the acid in the solution because of formation salt hydro (or solvent) gel, followed by setting and further hardening of the cement product.

A representative (and the most simplified) example of: this chemical process involves glass-ionomer chemistry, where the acid component in the rapid prototyping system is a polyacid such as polyacrylic acid. The basic component in this example is aluminosilicate glass, for example. The protons from the polyacrylic acid release upon the dissolving of the polyacrylic acid in the aqueous binder, and the protons attack the glass, which releases multivalent cations. The cations then crosslink the polyacid through formation of ionic bonds, and the bonding causes the polyacid components to compress and solidify until the cement is completely solidified and extremely hard.

There are three basic chemical components of the rapid prototyping system, namely, an active acidic component, an active basic component, and an aqueous binder. The basic component can be a metal oxide, and can also be an aluminosilicate glass. The aqueous binder must be capable of stimulating a crosslinking reaction between the basic component and the acidic component to form a three-dimensional printed object. The acidic component can be one or more acidic components such as an organic polyacid, a monomer acid, an oligomer acida monomer having anions capable of forming hydrogel (or solvent-gel) salts that are cross-linkable with metal ions from said basic metal oxide, and a hydrolyzable metal salt capable of forming an oxysalt polymer matrix with said basic metal oxide.

Examples of acid-base combinations that form a cement system for rapid prototyping include the following.
  a. Zinc oxide—polycarboxylic acid cements.
  b. Metal oxide (i.e., oxides of Be, Zn, Cu, Mg, Ca, Sr, Ba, or other metal oxides.)—orthophosphoric or poly(phosphoric acid) cements. In this case, metal cations crosslink phosphate anions resulting in the formation of a hydrogel matrix.
  c. A mixture of reactive aluminosilicate glasses, (i.e., $xCaO*yAl_2O_3*ZSiO_2*nCaF2$, and i.e. sometimes containing fluorine) with orthophosphoric or poly(phosphoric acid). In this case, setting of the cement involves the formation of a hydrogel matrix of silica gel and ionically crosslinked phosphate ions. The average particle size for the glass is preferably approximately 30–50 $\mu$m or less, as glass particles with a smaller diameter can be difficult to spread.
  d. Oxysalt-bonded cements. These are formed by acid-base reactions of metal oxide powder such as ZnO or MgO, although the metal oxide powder is not limited to these oxides, and a concentrated solution of metal chloride or sulfate where the metal is, for example, Zn or Mg.
  e. Glass-ionomer cements. In this case, the basic component of the system is reactive aluminosilicate glass (i.e., $xCaO*yAl_2O_3*zSiO_2$, and frequently containing fluorine, i.e., in the form of $CaF_2$, and the acidic component of the system is organic polyacid containing functional groups such as —COOH, —$SO_3H$, and —$PO_3H_2$. The glass ionomer mixture may also contain small amounts of low molecular weight complexing agent such as L- or D-tartaric acid for adjusting the kinetics of the cement setting process. In some cases, the glass-ionomer cements should be pretreated to make the surface of the polyacid powder less hydrophilic and therefore les susceptible to clumping due to moisture absorption. A preferable pretreatment includes the addition of some anti-caking hydrophobic agent to the dry cement mix. The agent could include some stearate salts (Mg, Ca, Zn) or lecithin at a concentration of between 0.01 and 13.0 wt %.

The above types of cements provide superior compressive strength and significantly better mechanical properties relative to common systems typically used in rapid prototyping systems. Using these cements, there is no need for any reinforcing post-treatment. The cements have a very short setting/curing time. No drying is necessary because water in the aqueous binder is consumed and becomes part of the solid phase during the acid-base setting reaction, which generally proceeds to completion much faster than drying of the green object composed of the materials currently present on the market. Further, the material produced by the cement has a continuous texture.

The cements of the present invention cure by means of ionic reactions like neutralization, salt formation, chelation, crystallization, or ionic and covalent cross-linking, specifically in the presence of water, or other polar solvent. As discussed above, the components included in the system preferably include a base such as a metal oxide or an aluminosilicate glass, an acidic component, and an aqueous binder. The acidic component is usually a polymeric acid (polycarboxylic, polysulfonic, polyphosphonic acids) or other acid (phosphoric acid, derivatives of salicylic acid), or a hydrolysable metal salt. The binder is not limited to an aqueous one. Any polar solvent capable of interacting acid and base components may be effective, so long as it can dissolve or solubilize the components and promote the cross-linking reaction.

In one of the embodiments of current invention, acid or polymeric acid component of the acid-base cement could be partially or fully substituted with unsaturated polymerizable acidic moieties of a monomeric or oligomeric nature, as well as their salts or other acid derivative groups. In such a case, a cross-linked hydrogel formed after the acid-base interaction of the cement components could be further fortified by polymerization and, hence, covalent cross-linking of the unsaturated moieties. Examples of polymerizable unsaturated monomers, oligomers or prepolymers with acid groups or reactive acid-derivative groups may include:
  unsaturated organic esters of phosphoric and phosphonic acids (German AS No. 2 711 234 & German OS No. 3 150 285),
  unsaturated organic esters of monofluorophosphoric acid (U.S. Pat. No. 3,997,504),
  unsaturated organic esters of phosphoric acids that contain either chlorine or bromine bonded directly to the phosphorus (Eur. Pat. No. 0 058 483), unsaturated organic esters of phosphoric acid in the form of pyrophosphates (anhydrides) (German OS No. 3 048 410), unsaturated carboxylic acids, unsaturated sulfur-containing organic acid moieties with groups of —$SO_2H$, —$SO_3H$, —O—$SO_3H$ type, unsaturated organic derivatives of boric acid i.e. the ones containing groups: —$B(OH)_2$, B(OH)(OR), —O—B $(OH)_2$, —O—B(OH)(OR) wherein R is H or alkyl, unsaturated organic moieties containing cationic acid radicals like $NR_2H^+$, —$RR_2H^+$ (wherein R is H or alkyl), and/or unsaturated organic moieties containing different combinations of the acidic species listed in the a) –h).

The reactive acid derivatives can be substituted with acid halides, with acid anhydrides, and with acid amides, nitrites, and esters, that readily hydrolyze into acid in the presence of water or other polar solvent, as such can enter into ion-exchange, neutralization, salt formation, or chelation reactions with the base component of the acid-base cement, i.e. metal oxides, ceramics, zeolites or leachable reactive glasses. Especially preferred are acid groups or reactive acid derivatives in the form of carboxylate, phosphate, phosphonate, sulfonate, or borate acid radicals or of their reactive derivatives.

The polymerizable unsaturated monomers, oligomers, or prepolymers in the polymerizable cement mixtures in accordance with the invention can carry alkenyl, alkenoxy, cycloalkenyl, aralkenyl, or alkenaryl radicals, with acryl, methacryl, vinyl, or styryl radicals being preferable and, of these, the acryl and methacryl radicals which constitute the polymerizable groups in many monomers are especially preferable. Especially appropriate are compounds that contain at least two polymerizable groups or at least two acid groups or acid-derivative groups. Examples are phosphoric-acid esters of glycerine dimethacrylate or 1-methacryloxyethane-1,1-diphosphonic acid.

The presence of polymerizable unsaturated acidic moieties in the acid-base cement systems is highly desirable, as well as the presence of a polymerization initiator in the mixture. The role of the initiator is to enable triggering of polymerization of the unsaturated species after the initial setting caused by the interaction of the acid and base components of the cement. The covalent polymerization of the unsaturated component of the cement could be initiated either by photoirradiation (light) or heat. An example of the initiator used for the light-triggered polymerization is mixture of a-diketones and tertiary amines. Typical initiators used for the heat-triggered polymerization include but are not limited to organic or inorganic peroxides such as benzoyl peroxide or ammonium persulfate.

The major purpose for the aqueous or polar solvent-based binder is to deliver and/or enable interaction of the acidic component of the cement with the basic component. Apart from water and/or solvent, the liquid binder may also contain:

a. surfactants/wetting agent to facilitate quick wetting of the powder surface by the binder, b. colorants such as dyes or pigments to provide color for the printed object, c. co-solvents to improve dye solubility in the binder, d. soluble polymers to modify rheological behavior and improve jettability of the binder, e. complexing agent, i.e. tartaric acid or EDTA, to control the setting behavior and rate of the acid-base reactive system.

In the case where the acidic part of the system contains covalently polymerizable acidic moieties, the initial acid-base interaction of the components is still used to print and produce the so-called "green object." After the initial printing, the mechanical properties, the ease of handling, and the resistance to environmental factors (moisture and/or humidity) of the "green object" is significantly enhanced by the post-treatment involving curing material of the object through exposure to light or heat. Polymerization of the unsaturated moieties in the "green object" results in covalent cross-linking and further fortification of the hydrogel salt matrix formed by the initial acid-base interaction.

In another embodiment of the current invention, covalent cross-linking of the unsaturated polymerizable moieties could be initiated immediately after the delivery of the aqueous or polar solvent-based binder into the powder. In this case covalent cross-linking happens in parallel with ionic cross-linking cased by acid-base interaction. The mechanical embodiment of this approach implies the presence of a source of light in the visible or UV range, or heat from, for example, IR radiation, above the printed powder surface. The "green object" in this case is cured at the same time as it is printed on the layer by layer basis.

An example reaction mixture involving reactive glass-ionomer chemistry in one embodiment of the invention includes between about 60% and about 90% by weight of a reactive aluminosilicate glass. An acidic powder having an average molecular mass of between about 2,000 about 1,000,000 is present at about 5 wt % to about 40 wt %. It is preferred that in this case the acid component is a polyacrylic acid having an average molecular weight that is between about 10,000 and about 150,000. L- or D-tartaric acid is also included. Finally, an ink-jettable aqueous binder is present at between about 5 wt % and about 50 wt % of the dry mixture.

There are other cement systems that can be used in accordance with the principles of the present invention. For example, acid-base cements that have previously been used for dental and surgical applications may be used with the present rapid prototyping system, and include polycarboxylate cements such as zinc oxide and polyacrylic acid-based surgical cements such as those disclosed in U.S. Pat. No. 3,751,391 which is hereby incorporated by reference, and glass-ionomer cements such as those disclosed in U.S. Pat. No. 3,814,717 which is hereby incorporated by reference, and in British Patent No. 1,316,129 which is also hereby incorporated by reference.

Several applications can be created and modified using the above-described materials in the present rapid prototyping system. According to a first application, the acidic and the basic component are mixed together in a dry powder form prior to the addition of the aqueous binder. Preferably in this application, the basic component is a metal oxide or a reactive glass as described above, and the acidic component is an organic polyacid or a metal salt. The surface of the powder is printed with ink-jettable aqueous binder, which dissolves the acidic component and causes initiation of the setting reaction. This approach is especially useful when the acidic component is a high molecular weight polyacid.

According to this first application and other applications, the aqueous binder may be delivered by an inkjet and may contain complexing agent(s) and coloring agent(s) as well. In the case where the chemistry involves a glass-ionomer system, the polyacid dissolves upon contact with the aqueous binder. A viscous liquid phase is formed, binding together partially reacted glass particles. When the polyacid is a high molecular weight compound the mechanical properties of the final product are significantly improved. The organic polyacid is preferably of an average molecular weight ranging from about 10,000 to about 150,000, although the range can be expanded to range from about 2,000 to about 1,000,000. Most preferably, the organic polyacid is of a molecular weight that is less than 100,000.

According to a second application of the present rapid prototyping system, the acidic component is stored separately from the powder, in a liquid form. Preferably, the acidic component is mixed with the aqueous binder. While not so limited, this approach could be typical for cases where the acidic component is of a relatively low average molecular weight. In any respect, the acid component is dissolved in the liquid binder and consequently is delivered to the basic component-containing powder by an inkjet in the case where inkjet printing is applied. One advantage of this approach is a more efficient reaction as there is no need for the acidic component to dissolve in the aqueous binder during printing.

According to a third application of the printing system of the present invention, the first two applications are combined, so that while some of the acidic component and all of the basic component are combined together in a dry powder form prior to the addition of the aqueous binder. Further, the aqueous binder is separately mixed with additional amounts of the acidic component prior to printing. Under this approach, it is preferred that the acidic component in the dry powder has a higher average molecular weight than that of the acidic component that is mixed with the aqueous binder. This approach combines the advantages of the first and second approaches. Further, the integrity of the finally produced object is improved because of the initial presence of the acidic polymer in the binder, and the ability for a relatively high average molecular weight acid polymer to mix with the powder. An additional benefit of this approach is improved solubility of the acidic component present in the powder. The acidic component present in the liquid binder helps to solubilize the acidic binder in the powder, and results in better structural uniformity of the printed object.

EXAMPLE #1

Powder mixture composition:

| Components | Pts, weight | Wt. % |
|---|---|---|
| L-Tartaric Acid | 0.015 | 1.23% |
| Schott Reactive Glass K1 | 1 | 81.30% |
| Poly(acrylic acid) M~50,000 spray-dried | 0.2 | 17.46% |
| Liquid Binder composition (%, wt.): | | |
| 2-Pyrrolidone | | 5.2% |
| Tergitol-15-S-7 | | 0.25% |
| Tergitol-15-S-5 | | 0.20% |
| Polyethyleneglycol (M~10K) | | 1.00% |
| Dowfax-8390 | | 0.15% |
| Water | | balance |

The colorless binder of the above formulation was jetted into the powder (glass-ionomer mixture). The binder/powder mass ratio during the printing was 1.5:10. The initial setting of the cement mixture was happening 2 min after the binder being jetted into the powder mix. The printing produced white object. The object had enough mechanical strength to be handled and cleaned from the non-reacted powder immediately after the printing was finished.

EXAMPLE #2

Powder mixture composition:

| Components | Pts, weight | Wt. % |
|---|---|---|
| L-Tartaric Acid | 0.015 | 1.23 |
| Experimental Reactive Glass LG163 * | 1 | 85.27 |
| Poly(acrylic acid) M~50,000 spray-dried | 0.2 | 13.50 |
| Liquid Binders composition (%, wt.): | | |
| Clear | | |
| 2-Pyrrolidone | | 5.2% |
| Tergitol-15-S-7 | | 0.25% |
| Tergitol-15-S-5 | | 0.20% |
| Polyethyleneglycol (M~10K) | | 1.00% |
| Dowfax-8390 | | 0.15% |
| Water | | balance |
| Yellow | | |
| 2-Pyrrolidone | | 5.2% |
| Tergitol-15-S-7 | | 0.25% |
| Tergitol-15-S-5 | | 0.20% |
| Polyethyleneglycol (M~10k) | | 1.00% |
| Dowfax-8390 | | 0.15% |
| Acid Yellow 23 (yellow dye) | | 0.6% |
| Water | | balance |
| Cyan | | |
| 2-Pyrrolidone | | 5.2% |
| Tergitol-15-S-7 | | 0.25% |
| Tergitol-15-S-5 | | 0.20% |
| Polyethyleneglycol (M~10K) | | 1.00% |
| Dowfax-8390 | | 0.15% |
| Direct Blue 199 (cyan dye) | | 0.6% |
| Water | | balance |
| Magenta | | |
| 2-Pyrrolidone | | 5.2% |
| Tergitol-15-S-7 | | 0.25% |
| Tergitol-15-S-5 | | 0.20% |
| Polyethyleneglycol (M~10K) | | 1.00% |
| Dowfax-8390 | | 0.15% |
| Ilford M377 (magenta dye) | | 0.6% |
| Water | | balance |

* Composition of LG163 - $4.5SiO_2 * Al_2O_3 * 1.5P_2O_5 * 4.5CaO * 0.5CaF_2$

The binders of the above formulation were jetted into the powder (glass-ionomer mixture). The binder/powder mass ratio during the printing was 1.7:10. The initial setting of the cement mixture was happening 4 min after the binder being jetted into the powder mix. The printing produced a colored object. The object had enough mechanical strength to be handled and cleaned from the non-reacted powder 5 min after the printing was finished.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A rapid prototyping material system, which comprises:
   a basic component selected from the group consisting of a metal oxide, and one or more aluminosilicate glasses;

an acidic component; and an aqueous binder capable of initiating a crosslinking reaction between said basic component and said acidic component to form a three-dimensional printed object;

wherein said basic component remains in a dry powder form prior to an application of said aqueous binder.

2. A rapid prototyping system according to claim 1, wherein said acidic component is one or more acidic components selected from the group consisting of an organic polyacid, a monomer acid, a monomer having anions capable of forming hydrogel salts that are cross-linkable with metal ions from said basic metal oxide, and a hydrolyzable metal salt capable of forming an oxysalt polymer matrix with said basic metal oxide.

3. A rapid prototyping system according to claim 1, wherein said basic component is a metal oxide, and said acidic component is a polycarboxylic acid.

4. A rapid prototyping system according to claim 3, wherein said metal oxide is zinc oxide.

5. A rapid prototyping system according to claim 1, wherein said basic component is a metal oxide, and said acidic component is at least one component selected from the group consisting of orthophosphoric acid and polyphosphoric acid.

6. A rapid prototyping system according to claim 5, wherein cations from said metal in said metal oxide are capable of mediating crosslinking of phosphate anionic species from said orthophosphoric acid and/or said polyphosphoric acid.

7. A rapid prototyping system according to claim 5, wherein said metal in said metal oxide is selected from the group consisting of Be, Zn, Cu, Mg, Ca, Sr and Ba.

8. A rapid prototyping system according to claim 1, wherein said basic component is a metal oxide, and said acidic component is a metal chloride or sulfate that forms an oxysalt bond with said metal oxide.

9. A rapid prototyping system according to claim 8, wherein each of said basic component and said acidic component includes Zn and/or Mg.

10. A rapid prototyping material system which comprises:
   a basic component selected from the group consisting of a metal oxide, and one or more aluminosilicate glasses;
   an acidic component; and
   an aqueous binder capable of initiating a crosslinking reaction between said basic component and said acidic component to form a three-dimensional printed object;
   wherein said basic component is one or more varieties of said aluminosilicate glass, and said acidic component is at least one component selected from the group consisting of orthophosphoric acid and polyphosphoric acid.

11. A rapid prototyping system comprising:
   basic component including one or more varieties of aluminosilicate glass;
   an acidic component selected from the group consisting of an organic polyacid and contains one or more functional groups selected from the group consisting of —COOH, —SO$_3$H, and —PO$_3$H$_2$; and
   an aqueous binder capable of initiating a crosslinking reaction between said basic component and said acidic component to form a three-dimensional printed object.

12. A rapid prototyping system according to claim 11, wherein said basic and acidic components combine to form glass-ionomer cements, and said system further comprises a complexing agent for adjusting reaction kinetics between said acidic component and said basic component.

13. A rapid prototyping system according to claim 12, wherein said complexing agent is L- or D-tartaric acid.

14. A rapid prototyping system comprising:
   a basic component selected from the group consisting of a metal oxide, and one or more aluminosilicate glasses;
   an acidic component; and
   an aqueous binder capable of initiating a crosslinking reaction between said basic component and said acidic component to form a three-dimensional printed object;
   wherein said acidic and said basic component are mixed together in a dry powder form prior to the addition of said aqueous binder, said acidic component being an organic polyacid of an average molecular weight ranging from about 500 to about 1,000,000.

15. A rapid prototyping system according to claim 14, wherein said organic polyacid is of an average molecular weight ranging from about 2,000 to about 150,000.

16. A rapid prototyping system comprising:
   a basic component selected from the group consisting of a metal oxide, and one or more aluminosilicate glasses;
   an acidic component; and
   an aqueous binder capable of initiating a crosslinking reaction between said basic component and said acidic component to form a three-dimensional printed object;
   wherein said basic component is in a powder form, and said acidic component is stored separately in a liquid form, and mixed with said aqueous binder.

17. A rapid prototyping system comprising:
   a basic component selected from the group consisting of a metal oxide, and one or more aluminosilicate glasses;
   an acidic component; and
   an aqueous binder capable of initiating a crosslinking reaction between said basic component and said acidic component to form a three-dimensional printed object;
   wherein said acidic and said basic component are combined together in a dry powder form prior to the addition of said aqueous binder, and said aqueous binder is separately mixed with additional amounts of said acidic component.

18. A rapid prototyping system according to claim 17, wherein said acidic component in said dry powder has a higher average molecular weight than said acidic component that is mixed with said aqueous binder.

19. A rapid prototyping system comprising:
   a basic component selected from the group consisting of a metal oxide, and one or more aluminosilicate glasses;
   an acidic component; and
   an aqueous binder capable of initiating a crosslinking reaction between said basic component and said acidic component to form a three-dimensional printed object;
   wherein said acidic component further includes unsaturated covalently polymerizable unsaturated acidic moieties of a monomeric or oligomeric nature, and/or salts or other acid derivative groups of said moieties; and said system further includes a polymerization initiator.

20. A composition for rapid prototyping, which comprises:
   a basic component and an acidic component mixed together in a dry powder form, wherein said basic component is selected from the group consisting of a metal oxide, and one or more aluminosilicate glasses, and said acidic component is one or more acidic components selected from the group consisting of an organic polyacid, a monomer acid, a monomer having anions capable of forming hydrogel salts that are cross-linkable with metal ions from said basic metal oxide, and a hydrolyzable metal salt capable of forming an oxysalt polymer matrix with said basic metal oxide.

21. A composition according to claim 20, wherein said acid component is an organic polyacid of an average molecular weight ranging from about 2,000 to about 1,000,000.

22. A composition according to claim 21, wherein said organic polyacid is of an average molecular weight ranging from about 10,000 to about 150,000.

23. A composition according to claim 20, wherein said acid component is an organic polyacid having a higher average molecular weight than that of a separate acid component that is mixed with an aqueous binder capable of stimulating a crosslinking reaction between a basic component and said acidic component to form a three-dimensional printed object.

24. A composition according to claim 20, wherein said acidic component further includes unsaturated covalently polymerizable acidic moieties of a monomeric or oligomeric nature, and/or salts or other acid derivative groups of said moieties; and said composition further includes a polymerization initiator.

25. A composition for rapid prototyping, which comprises:
    an acidic component mixed with an aqueous binder capable of stimulating a crosslinking reaction between a basic component and said acidic component to form a three-dimensional printed object, the basic component being selected from the group consisting of a metal oxide, and one or more aluminosilicate glasses in powder form prior to an application of said aqueous binder, and the acid component being one or more acidic components selected from the group consisting of an organic polyacid, a monomer acid, a monomer having anions capable of forming hydrogel salts that are cross-linkable with metal ions from said basic metal oxide, and a hydrolyzable metal salt capable of forming an oxysalt polymer matrix with said basic metal oxide.

26. A composition according to claim 25, wherein said acidic component further includes unsaturated covalently polymerizable acidic moieties of a monomeric or oligomeric nature, and/or salts or other acid derivative groups of said moieties; and said composition further includes a polymerization initiator.

27. A method for printing a three-dimensional object, which comprises:
    iteratively infiltrating individual layers of powder including a basic component with an aqueous binder solution capable of stimulating a crosslinking reaction between said basic component and an acidic component, the infiltrated powder layers being formed adjacent to one another to form said three-dimensional printed object, wherein said basic component is selected from the group consisting of a metal oxide, and one or more aluminosilicate glasses, and said acid component is mixed with said powder and/or said aqueous binder solution.

28. A method according to claim 27, wherein said acid component is selected from the group consisting of an organic polyacid, a monomer acid, a monomer having anions capable of forming hydrogel salts that are cross-linkable with metal ions from said basic metal oxide, and a hydrolyzable metal salt capable of forming an oxysalt polymer matrix with said basic metal oxide.

29. A method according to claim 27, wherein said basic component is a metal oxide, and said acidic component is a polycarboxylic acid.

30. A method according to claim 29, wherein said metal oxide is zinc oxide.

31. A method according to claim 27, wherein said basic component is a metal oxide, and said acidic component is at least one component selected from the group consisting of orthophosphoric acid and polyphosphoric acid.

32. A method according to claim 31, wherein cations from said metal in said metal oxide are capable of crosslinking with phosphate anions from said orthophosphoric acid and/or said polyphosphoric acid.

33. A method according to claim 32, wherein said metal in said metal oxide is selected from the group consisting of Be, Zn, Cu, Mg, Ca, Sr and Ba.

34. A method according to claim 27, wherein said basic component is one or more varieties of said aluminosilicate glass, and said acidic component is at least one component selected from the group consisting of orthophosphoric acid and polyphosphoric acid.

35. A method according to claim 27, wherein said basic component is a metal oxide, and said acidic component is a metal chloride or sulfate that forms an oxysalt bond with said metal oxide.

36. A method according to claim 35, wherein each of said basic component and said acidic component includes Zn and/or Mg.

37. A method according to claim 27, wherein said basic component is one or more varieties of said aluminosilicate glass, and said acidic component is an organic polyacid and contains containing one or more functional groups selected from the group consisting of —COOH, —SO$_3$H, and —PO$_3$H$_2$.

38. A rapid prototyping system according to claim 37, wherein said basic and acidic components combine to form glass-ionomer cements, and said system further comprises a complexing agent for adjusting reaction kinetics between said acidic component and said basic component.

39. A method according to claim 38, wherein said complexing agent is L-or D-tartaric acid.

40. A method according to claim 27, wherein said acidic component is mixed with said dry powder prior to the addition of said aqueous binder, said acidic component being an organic polyacid of an average molecular weight ranging from about 2,000 to about 1,000,000.

41. A method according to claim 40, wherein said organic polyacid is of an average molecular weight ranging from about 10,000 to about 150,000.

42. A method according to claim 27, wherein said acidic component is entirely separate from said powder, and is mixed with said aqueous binder.

43. A method according to claim 27, wherein said acidic component is mixed with said dry powder prior to the addition of said aqueous binder, and said aqueous binder is separately mixed with additional amounts of said acidic component.

44. A method according to claim 43, wherein said acidic component mixed with said dry powder has a higher average molecular weight than said acidic component that is mixed with said aqueous binder.

45. A method according to claim 44, wherein said acidic component further includes unsaturated covalently polymerizable acidic moieties of a monomeric or oligomeric nature, and/or salts or other acid derivative groups of said moieties; and said system further includes a polymerization initiator.

46. A rapid prototyping material system, which comprises:

a basic component including one or more aluminosilicate glasses;

an acidic component; and an aqueous binder capable of initiating a crosslinking reaction between said basic component and said acidic component to form a three-dimensional printed object.

47. A rapid prototyping system according to claim 46, wherein said acidic component is at least one component selected from the group consisting of orthophosphoric acid and polyphosphoric acid.

48. A rapid prototyping system according to claim 46, wherein said acidic component is an organic polyacid and contains one or more functional groups selected from the group consisting of —COOH, —SO$_3$H, and —PO$_3$H$_2$.

49. A rapid prototyping system according to claim 48, wherein said basic and acidic components combine to form glass-ionomer cements, and said system further comprises a complexing agent for adjusting reaction kinetics between said acidic component and said basic component.

50. A rapid prototyping system according to claim 49, wherein said complexing agent is L- or D-tartaric acid.

51. A rapid prototyping system according to claim 46, wherein said acidic and said basic component are mixed together in a dry powder form prior to the addition of said aqueous binder, said acidic component being an organic polyacid of an average molecular weight ranging from about 500 to about 1,000,000.

52. A rapid prototyping system according to claim 51, wherein said organic polyacid is of an average molecular weight ranging from about 2,000 to about 150,000.

53. A rapid prototyping system according to claim 46, wherein said acidic component further includes unsaturated covalently polymerizable unsaturated acidic moieties of a monomeric or oligomeric nature, and/or salts or other acid derivative groups of said moieties; and said system further includes a polymerization initiator.

* * * * *

UNITED STATES PATENT AND TRADEMARK OFFICE
CERTIFICATE OF CORRECTION

PATENT NO. : 6,742,456 B1
DATED : June 1, 2004
INVENTOR(S) : Kasperchik et al.

It is certified that error appears in the above-identified patent and that said Letters Patent is hereby corrected as shown below:

Title page,
Item [57], ABSTRACT,
Line 1, delete "preferably".

Column 9,
Line 45, delete "hinder" and insert therefor -- binder --.
Line 54, before "basic", insert -- a --.

Signed and Sealed this

Fifteenth Day of February, 2005

JON W. DUDAS
*Director of the United States Patent and Trademark Office*